W. MITCHELL.
STANCHION CONTROL MECHANISM.
APPLICATION FILED JUNE 13, 1919.
1,401,428.
Patented Dec. 27, 1921.
2 SHEETS—SHEET 2.
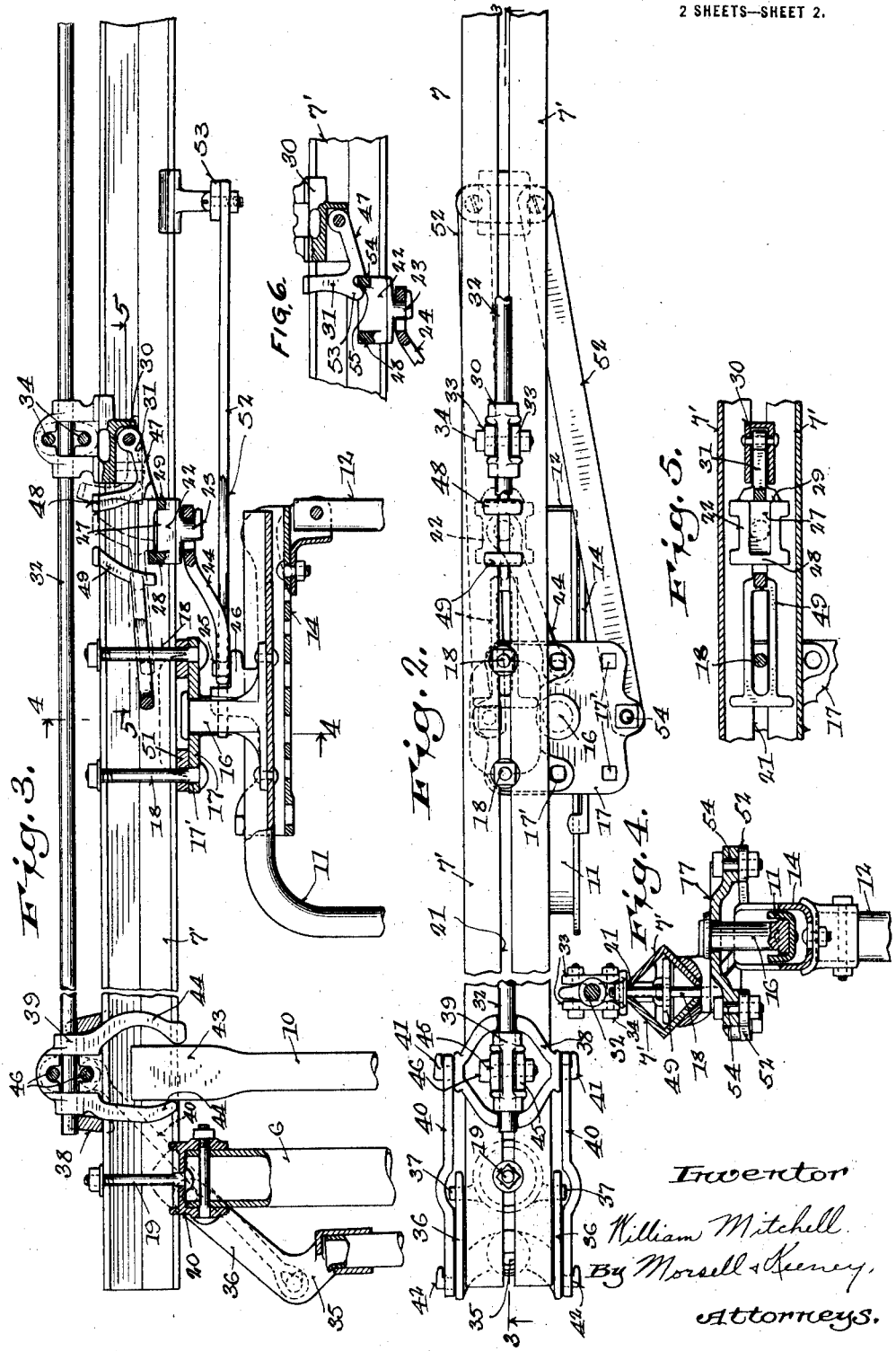

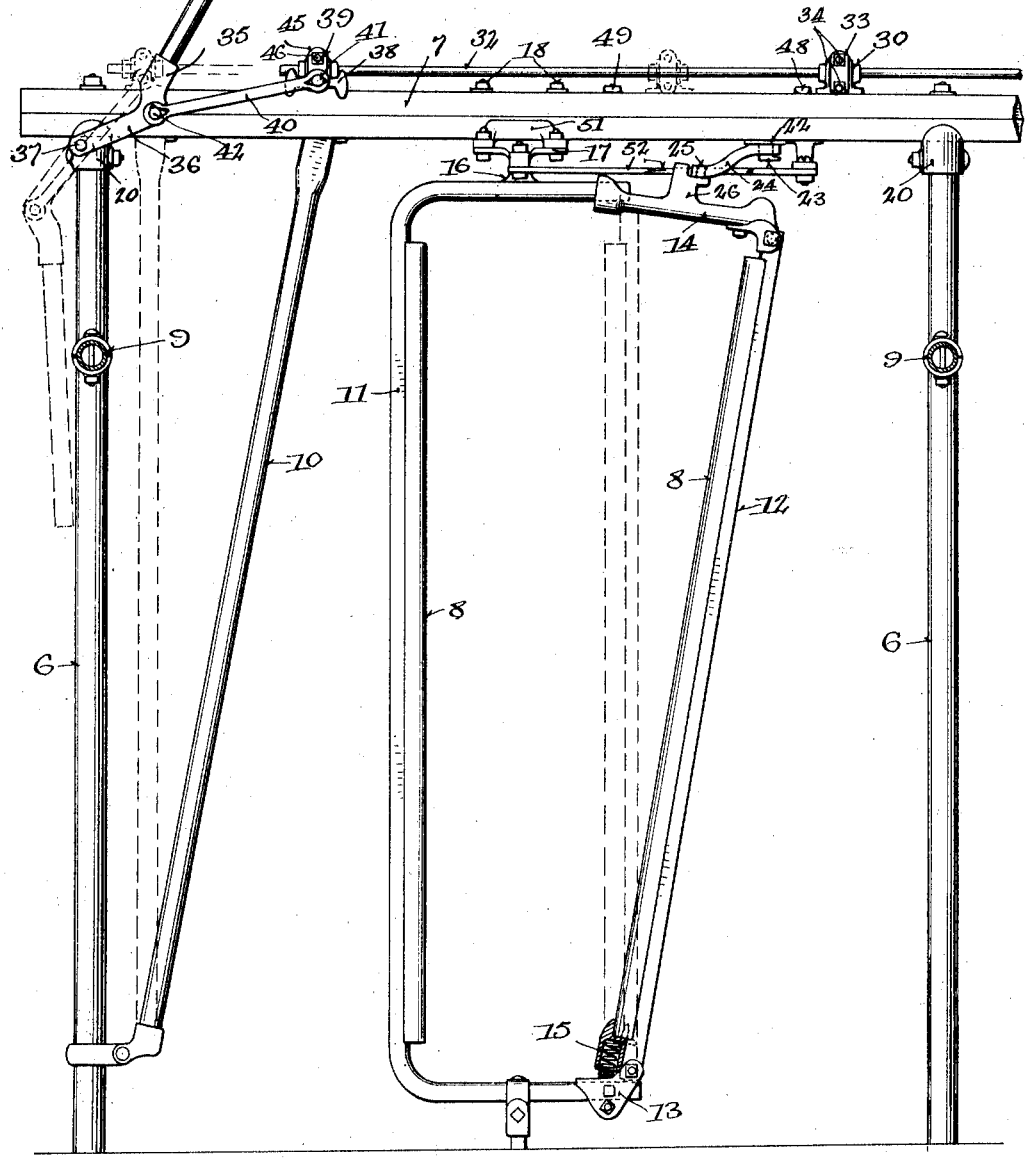

UNITED STATES PATENT OFFICE.

WILLIAM MITCHELL, OF MILWAUKEE, WISCONSIN.

STANCHION-CONTROL MECHANISM.

1,401,428.  Specification of Letters Patent.  Patented Dec. 27, 1921.

Application filed June 13, 1919. Serial No. 304,060.

*To all whom it may concern:*

Be it known that I, WILLIAM MITCHELL, a citizen of the United States, and resident of Milwaukee, in the county of Milwaukee and State of Wisconsin, have invented new and useful Improvements in Stanchion-Control Mechanism, of which the following is a description, reference being had to the accompanying drawings, which are a part of this specification.

The invention relates to stanchions and operating mechanism therefor in which a series of stanchions may be simultaneously opened and closed together, in which any one of the stanchions may be independently opened or closed, and in which any one of the stanchions may be independently held closed while the others of the series are being opened or closed.

The invention further consists in the several features described in the following specification and shown in the accompanying drawings in which:

Figure 1 is an elevation view of the device embodying the invention; Fig. 2 is a plan view thereof; Fig. 3 is a section taken on the line 3—3 of Fig. 2; Fig. 4 is a section on the line 4—4 of Fig. 3; Fig. 5 is a section taken on the line 5—5 of Fig. 3; Fig. 6 is a detail of a modified form of the construction.

In the drawings I have shown a single stall, stanchion and guard, but it is to be understood that a series of these units is contemplated so that the operating mechanism hereinafter described will operate a plurality of stanchions and guards.

In the drawings, the numeral 6 designates the stall uprights, 7 the top bar, 8 the stanchion secured at its upper end to the top bar, 9 the stall partitions (in section) and 10 the guard bar.

Each stanchion consists of a relatively fixed channel U-bar 11 and a movable side bar 12 pivotally secured at its lower end by a clip 13 to the lower end of the bar 10. It will be understood by those skilled in the art that instead of a single fixed U-bar, a fixed side bar and top and bottom bars may be employed. A channel guide member 14 is pivotally secured at one end to the side bar 12 and is slidably mounted upon the upper transverse portion of the U-bar 11. A spring 15 normally acts to move the side bar 12 to open position. A swivel bolt 16 is loosely pivotally mounted in a plate 17 secured by bolts 18 to the top bar 7. While the spring serves to move the bar to open position the opening of the stanchion by the mechanism hereinafter described need not necessarily be used with a spring as the release of the operating mechanism will permit the cow to move the sidebar to open position herself.

The top bar 7 consists of two angle bars 7' connected together in horizontal spaced relation by bolts 19 carried by couplings 20 secured to the upper ends of the uprights whereby longitudinally extending slots 21 are provided in the top bar.

A block 22 is slidably mounted in the channel formed by the bars 7' and has a portion, depending below the lower slot 21, provided with a pin or lug 23 upon which one end of a link 24 is pivotally mounted, the other end of said link being pivotally connected to a pin 25 upon a projection 26 on the member 14. The block 22 has a recess 27 in its top and a locking rib 28 at one end of the recess and a stop shoulder 29 at the other end.

As noted above each stanchion is provided with a spring 15 which normally acts to move the side bar 12 outwardly and consequently to move the member 14 and block 22 outwardly, though this may be done by the cow herself. The action of each spring or of the cow herself is normally prevented by a slide block 30 having a latch 31 pivotally secured thereto, the slide blocks for all the stanchions being connected to a common actuating bar 32 by means of clamping clips 33 and bolts 34. The bar 32 is reciprocated by means of a lever 35 and a connection between said lever and bar. The lever 35 has a forked end 36 pivotally connected to pins 37 on one of the couplings 20. The connection between said lever and bar 32 consists of a slide block 38 secured to a member 39 on the bar 32 and links 40 pivotally connected at one of their ends to pins 41 on the block 38 and to pins 42 carried by the forked portion 36 intermediate the ends of said lever 35. The forked end 36 of the lever is offset from its handle portion as are also the pins 42 so that when the lever is moved down to the dotted line position shown in Fig. 1 the links 40 will be moved beyond dead center position and the bar 32 will thus be held against movement. When it is desired to move the bar 32 forwardly the lever 35 is moved to the full line position shown in Fig. 1. The forward movement of the lever moves the blocks 30 and latches 31 forwardly and this permits the blocks 22 connected to the stanchions as previously described to move forwardly under the action of the springs 15 to move the side bars 10 to open position. A reverse movement of the bar 32 will move the side bars 10 to closed position against the action of the springs 15 as each latch 31 engages the block 22 adjacent it and moves said block rearwardly on the reverse movement of the rod.

In order to prevent the cow from entering her head between the fixed bar 11 and the adjacent stall upright when the stanchion is open each stall has a guard bar 10 pivotally connected at its lower end to the stall upright 6 adjacent the bar 11 and loosely slidably mounted at its upper end 43 between spaced fingers 44 on the member 39 which member is secured to the bar 32 by clips 45 and bolts 46, said end 43 being also slidably mounted in the lower slot 21 between the bars 7'. With this construction the forward movement of bar 32 moves the guard 10 to guarding position as shown in Fig. 1 and in closing the guard moves to the dotted line position.

When it is desired to open one stanchion independently of the others of the series which are controlled from the same actuating means, the latch 31 is raised from engagement with the block 32, and when its lower end is lifted from engagement with the shoulder 29, the block 22 together with the side bar 12 is free to move to open position. The stanchion thus opened may be closed by hand, or when the other stanchions of the series are closed as the latch 31 has an inclined side 47 which is engaged by the rib 28 of the block 22 to lift said latch to permit said block to be moved forwardly in front of the latch. For individual operation the latch 31 is manipulated from the finger lugs 48.

When it is desired to keep one stanchion closed independently of the others, a locking latch 49 is moved to engage the rib 28, said latch being provided with a slot 50 through which one of the bolts 18 passes so as to permit a limited movement of the latch. In Fig. 3 the dotted line position of the latch 49 indicates its locking position in which case the movement of the bar 32, block 30 and latch 31 to open or closed position will not affect the stanchion as the latch 49 prevents movement of the block 22.

To provide for alining the stanchion at different distances with respect to the stall, the plate 17 is provided with three series of apertures 17', any one set of which is adapted to receive the bolts 18 and said plate is firmly secured to the top bar by interposing member 51 through which the bolts 18 also pass and which is also secured to the plate 17 by bolts 52.

When the stanchion is in closed position the link 24 and sliding block 22 permit the stanchion to be turned about the plate 17 through a ninety degree angle in either direction, but when the stanchion is open this movement must be prevented and this is done by providing stop and guide bars 52 which are each connected at one of their ends to a clip 53 secured to the top bar and at their other ends to a plate 17 by means of bolts 54.

In the detail view of Fig. 6 I have shown the latch 31 provided with a finger 53 adapted to engage over a rib 54 formed on the block 22. With this construction it is not necessary to use the spring 15 as the forward movement of the bar 32 will cause the latch 31 with finger 53 to move the bar 12 to open position when the stanchions are opened. When, however, one of the stanchions is locked closed by the latch 49, the curved surface 55 of the finger 53 engaging the rib 54 will cause the latch 31 provided with this finger to be moved upwardly so as not to interfere with the opening of the other stanchions.

What I claim as my invention is:

1. The combination with a stall provided with a longitudinally channeled top frame member, of a stanchion mounted in said stall and provided with a movable side bar, a slide block mounted within the top frame member, a link operatively connecting said slide block to said side bar, means producing lateral movement of said slide block to open or close the stanchion, and a latch concealed in the channel of the top frame for engaging said block to keep the stanchion closed when desired.

2. The combination, with a series of stall frames and a stanchion mounted in each frame and provided with a movable side bar, of a slide block mounted on the upper portion of each stall frame, a slide member mounted in the upper portion of each stall frame, each slide member normally engaging the slide block to prevent opening of the stanchion, means operatively connecting said slide block with the stanchion slide bar and common actuating means for moving all of said slide members outwardly to permit opening of the stanchions.

3. The combination with a series of stalls connected together at their inner ends by a tubular transverse top frame member provided with a longitudinally extending slotted guideway communicating with the interior thereof, of a stanchion mounted in each stall and provided with a movable side bar, a member slidably mounted within the tubular frame member adjacent each stanchion and having a part projected through the slotted guideway, means operatively connecting said member part projected through the slotted guideway with the side bar of the adjacent stanchion, a slidably mounted block adjacent each stanchion and having a portion projected into the interior of said tubular frame member, a pivoted latch member for connecting and disconnecting the adjacent first mentioned members and said block members, and means for moving said block members to operate said first mentioned members and permit the opening of the stanchion.

In testimony whereof, I affix my signature.

WILLIAM MITCHELL.